United States Patent [19]
Nakao et al.

[11] Patent Number: 6,072,702
[45] Date of Patent: Jun. 6, 2000

[54] RINGING CHOKE CONVERTER

[75] Inventors: Fumiaki Nakao; Satoshi Ohta, both of Shizuoka, Japan

[73] Assignee: FDK Corporation, Tokyo, Japan

[21] Appl. No.: 09/332,093

[22] Filed: Jun. 14, 1999

[30] Foreign Application Priority Data

Nov. 13, 1998 [JP] Japan .................................. 10-324056

[51] Int. Cl.$^7$ ............................................. H02M 3/335
[52] U.S. Cl. ................................................ 363/19
[58] Field of Search ............................. 363/18, 19, 40, 363/56, 97, 131

[56] References Cited

U.S. PATENT DOCUMENTS

| | | | |
|---|---|---|---|
| 4,862,338 | 8/1989 | Tanaka | 363/19 |
| 5,012,399 | 4/1991 | Takemura et al. | 363/18 |
| 5,317,494 | 5/1994 | Noro | 363/18 |
| 5,917,712 | 8/1989 | Okura et al. | 363/19 |

*Primary Examiner*—Matthew Nguyen
*Attorney, Agent, or Firm*—Wenderoth, Lind & Ponack, L.L.P.

[57] ABSTRACT

A ringing choke converter capable of reducing the variation in a switching frequency to a low level even if the variation in load is large is disclosed. The ringing choke converter also serves for improvement of efficiency and solution of noise-problems. A ringing choke converter comprises a turn-on control system which detects the turn-off of the switching transistor Q1, and forcedly turns on the switching transistor Q1 after a predetermined amount of time. This turn-on control system comprises a conductive-type controlling transistor Q3 which is a different type from the switching transistor Q1, a resistance R3, and a capacitor C3. The collector of the controlling transistor Q3 is connected to the connecting point between the resistance R2 and the capacitor C2. The emitter of the transistor Q3 is connected to one end of the base winding L3. The resistance R3 is connected between the base of the transistor Q3 and the other end of the base winding L3. The capacitor C3 is connected between the base and the emitter of the transistor Q3.

6 Claims, 5 Drawing Sheets

RINGING CHOKE CONVERTER

BACKGROUND OF THE INVENTION

1. Field of the Invention

This invention relates to a modification of a self-excited type DC/DC converter, particularly to a modification of a ringing choke converter.

2. Description of the Related Art

Ringing choke converters are inexpensive devices, generally requiring a small number of components. Since they demonstrate stabilized DC characteristics, they are often used as power supplies for general appliances using electric circuits, such as VTRs.

FIG. 1 shows an example of an existing ringing choke converter. In this example, one end of a primary winding L1 of a transformer T is connected to one input terminal A. The other end of the primary winding L1 is connected to the collector of a switching transistor Q1. The emitter of the switching transistor Q1 is connected to the other input terminal B. The output of a secondary winding L2 of the transformer T is connected to the output terminals X, Y via a rectifying/smoothing circuit including a diode D1 and a capacitor C1.

One end of a base winding L3 of the transformer T is connected to the base of the switching transistor Q1 via a base-driving device consisted of a series circuit including a resistance R2 and a capacitor C2. The other end of the base winding L3 is connected to the emitter of the switching transistor Q1. The base of the switching transistor Q1 is connected to the input terminal A via a starting resistance R1. The switching transistor is turned on and off repetitively by the self-excited oscillation of this base-driving system.

The description given above explains a well-known structure of a ringing choke converter. However, this basic circuit system is not designed to provide a constant output voltage $V_{out}$. Therefore, a system adapted to control the timing to turn off the switching transistor Q1 is provided in order to stabilize the output voltage $V_{out}$. This control system variably controls the turn-off timing in accordance with the output voltage $V_{out}$ detected either directly or indirectly. In FIG. 1, the timing-control system comprises a controlling transistor Q2 connected between the base and the emitter of the switching transistor Q1, and a feedback controlling circuit 10 for driving the controlling transistor Q2. When the controlling transistor Q2 is turned on upon receipt of an output signal from the feedback controlling circuit 10 while the switching transistor Q1 is turned on, the base current of the switching transistor Q1 is taken by the controlling transistor Q2, and thereby the switching transistor Q1 is forcedly turned off. Therefore, there is provided a feedback control mechanism which is capable of adjusting the ON duration of the switching transistor Q1, and capable of maintaining the output voltage $V_{out}$ at a constant level.

It is well known in the art that if the input and output voltages are kept at a constant level, the oscillating frequency of a ringing choke converter is inversely proportional to the load current, i.e., the frequency is increased as the load becomes smaller. However, a ringing choke converter is generally designed so that a predetermined amount of electric power is supplied when the load is at its maximum value. If the minimum load were to be 1/100 of the maximum load, the switching frequency at minimum load current would, theoretically, amount to 100 times the frequency at maximum load. High frequency usually results in increase in switching losses, decrease in efficiency, and causes undesirable radiation noise problems.

In a ringing choke converter employed as a power supply for VTRs or other such devices, there is quite a difference between the minimum load during the standby-mode and the maximum load during the normal playing-mode. Therefore, the switching frequency during the standby-mode becomes exceedingly high, thereby causing problems such as reduction in efficiency and increase of noise.

SUMMARY OF THE INVENTION

In order to solve the above-mentioned and other problems, it is an object of this invention to provide a ringing choke converter capable of reducing the variation in a switching frequency to a low level even if the variation in load is large, while improving efficiency and solving noise-problems.

A ringing choke converter according to one aspect of the present invention is comprised of the following features (1) through (5).

(1) Respective ends of a primary winding of a transformer are connected to one input terminal and to a collector of a switching transistor. An emitter of the switching transistor is connected to the other input terminal.

(2) An output of a secondary winding of the transformer is connected to output terminals via a rectifying/smoothing circuit.

(3) One end of a base winding of the transformer is connected to a base of the switching transistor via a base driving device, and the other end of the base winding is connected to the emitter of the switching transistor, in order to turn on and off the switching transistor repetitively by self-oscillation.

(4) A turn-off control system is provided therewith for stabilizing the voltage at the output terminals by variably controlling a turn-off timing of the switching transistor according to a voltage detected directly or indirectly at the output terminals.

(5) A turn-on control system is provided therewith which detects a change in circuit operation when the switching transistor is turned off, and forcedly turns on the switching transistor when a predetermined period of time elapsed after the detection of change.

Preferably, the base driving elements may comprise a series circuit of a resistance (R2) and a capacitor (C2). The resistance (R2) has one end connected to the base winding and the capacitor (C2) has one end connected to the base of the switching transistor. The turn-on control circuit may preferably comprise a conductive-type transistor (Q3) which is a different type from the switching transistor, a resistance (R3), and a capacitor (C3). A collector of the transistor (Q3) is connected to a connecting point of the resistance (R2) and capacitor (C2). An emitter of the transistor (Q3) is connected to the other end of the base winding (L3). The resistance (R3) is connected between the base of the transistor (Q3) and the one end of the base winding (L3), and the capacitor (C3) is connected between the base and the emitter of the transistor (Q3).

A diode (D2) may be inserted between the collector of the transistor (Q3) and the connecting point of the resistance (R2) and the capacitor (C2) in a forward direction of a collector current of the transistor (Q3).

Preferably, a diode (D3) may be connected in parallel to the resistance (R3) to charge the capacitor (C3) by a current through the diode (D3) so that the transistor (Q3) is reverse-biased.

It is preferable that the transformer has a nonlinear characteristic in which an inductance of which becomes smaller when the current through the primary winding increases.

According another aspect of the present invention, a self-excited DC/DC converter comprises a transformer having a primary winding and a secondary winding, the primary winding connected to input terminals, a switching transistor for controlling an input current through the primary winding of the transformer;

a rectifying/smoothing circuit connected between the secondary winding and output terminals;

a base driving circuit including a base winding at a primary side of the transformer for turning on and off the switching transistor by self-oscillation;

a turn-off control circuit for stabilizing a voltage at the output terminals by directly or indirectly detecting the voltage at the output terminals to variably control a turn-off timing of the switching transistor according to the detected voltage; and a turn-on control circuit for detecting a change in circuit operation when the switching transistor is turned off so as to turn on the switching transistor after a predetermined period of time after the detection.

DETAILED DESCRIPTION OF PREFERRED EMBODIMENTS

Figure 1:
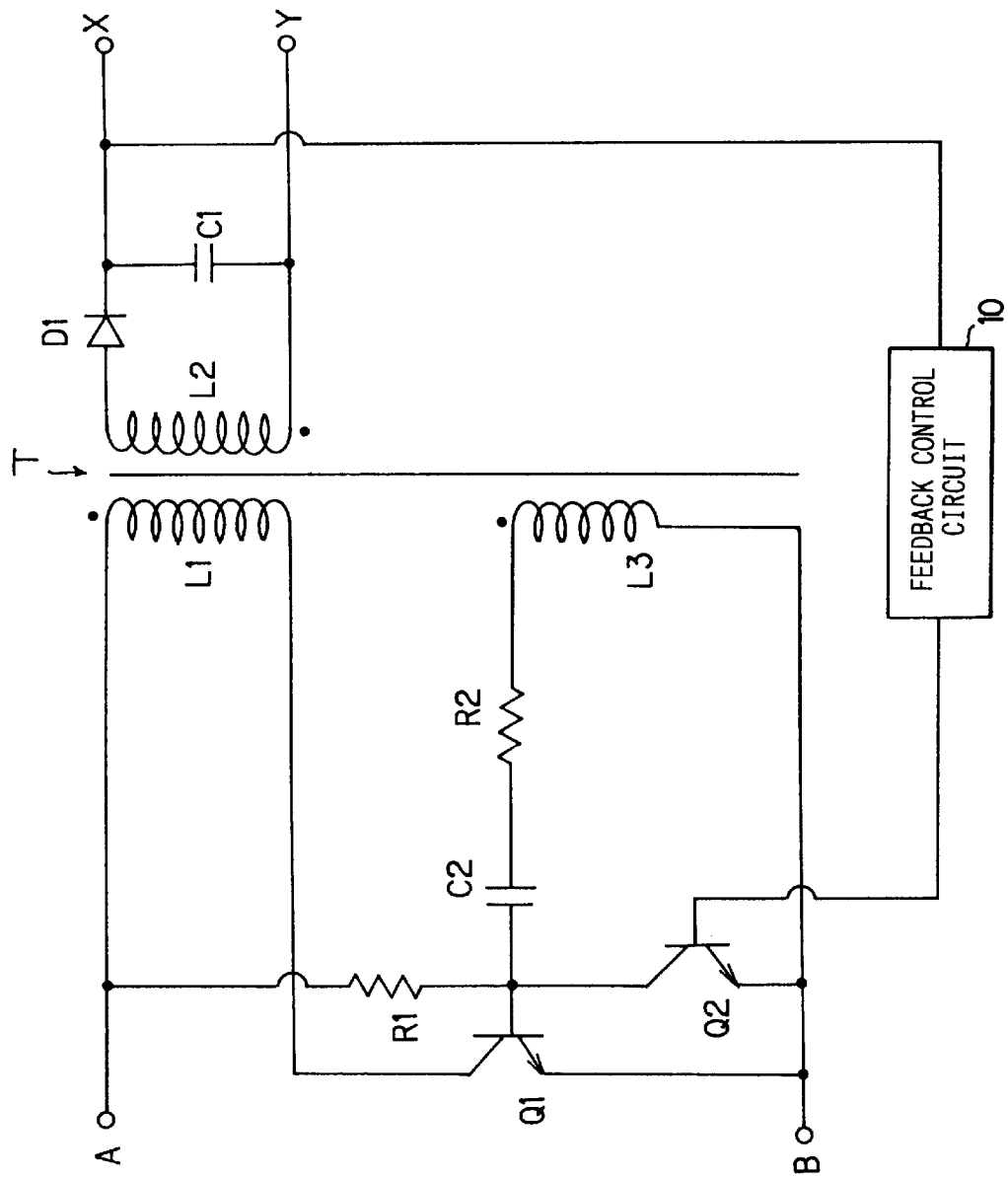
FIG. 1 is a schematic circuit diagram of a typical ringing choke converter.
Figure 2:
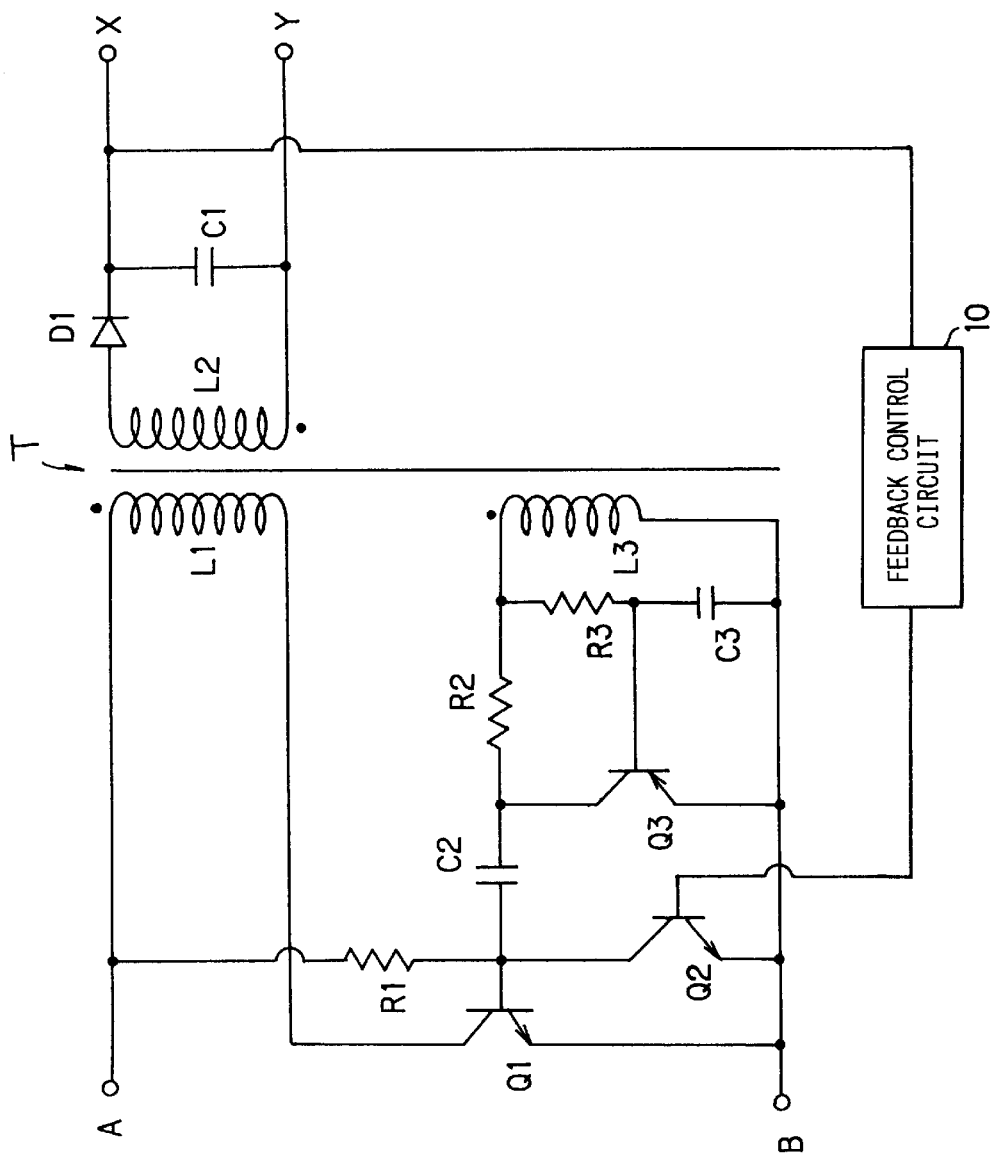
FIG. 2 is a schematic circuit diagram of a ringing choke converter according to one embodiment of the present invention.

FIG. 2 portrays a diagram showing a circuit structure of a ringing choke converter according to one embodiment of the present invention. In this embodiment, a turn-on control circuit capable of controlling a timing to turn on a switching transistor is added to an existing ringing choke converter shown in FIG. 1.

A primary winding L1, a secondary winding L2, and a base winding L3 of a transformer T, a switching transistor Q1, a rectifying diode D1, a smoothing capacitor C1, base driving elements of a resistance R2 and a capacitor C2, a feedback control circuit 10, and a controlling transistor Q2 which stabilizes an output voltage, are all connected in the same manner and have the same operating characteristics as those in the circuit shown in FIG. 1.

In FIG. 2, the aforesaid base driving elements define a series circuit comprising a resistance R2 having one end connected to the base winding L3, and a capacitor C2 having one end connected to a base of the switching transistor Q1. The aforesaid turn-on control circuit is connected in relation to this base driving circuit.

The turn-on control circuit comprises a conductive-type controlling transistor Q3 which is a different type from the switching transistor Q1, a resistance R3, and a capacitor C3. A collector of the controlling transistor Q3 is connected to a connecting point of the resistance R2 and the capacitor C2. An emitter of the controlling transistor Q3 is connected to an end of the base winding L3 and to an emitter of Q1. The resistance R3 is connected between a base of the controlling transistor Q3 and a connecting point between the other end of the base winding L3 and the resistance R2. The capacitor C3 is connected between the base and the emitter of the controlling transistor Q3.

Figure 3:
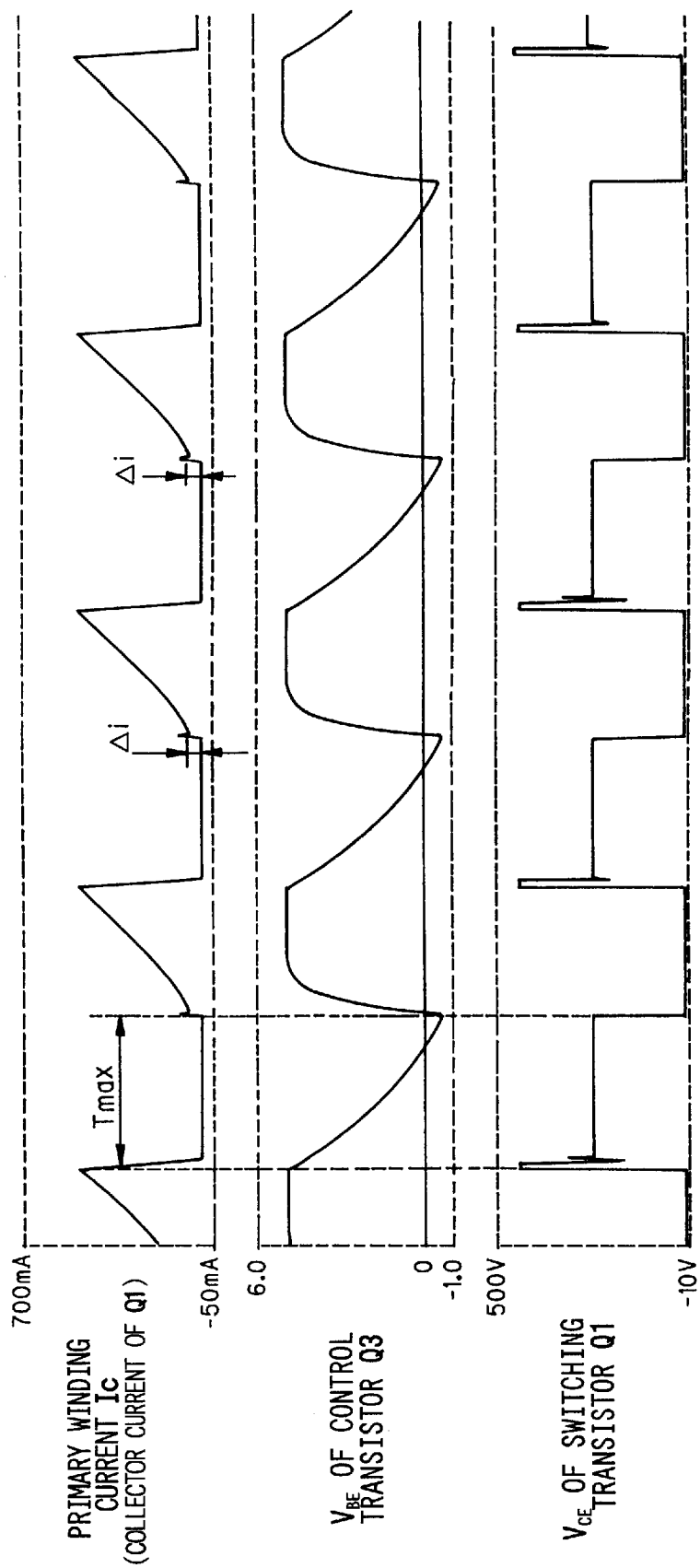
FIG. 3 is a wave-form chart of portions of the circuit shown in FIG. 2.

The operation of the turn-on control circuit will be described hereinafter. FIG. 3 depicts respective waveforms detected at corresponding portions in the circuit shown in FIG. 2.

Firstly, while the switching transistor Q1 is turned on, a collector current Ic of the primary winding L1 is gradually increased. During this period, the capacitor C2 connected to the base of the transistor Q1 is charged so that the base side is of a negative pole and the R2 side is of a positive pole.

When the switching transistor Q1 is turned off, the energy stored in the transformer T is discharged, and an output current is generated in the secondary winding L2. During this period, the capacitor C2 connected to the base of the transistor Q1 is charged by a current through the starting resistance R1 so that the base side of C2 is of a positive pole and the R2 side of C2 is of a negative pole. Then, the current generated in the base winding L3 passes from the capacitor C3 to the resistance R3, and the capacitor C3 is gradually charged. When the capacitor C3 is charged up to a predetermined voltage, the controlling transistor Q3 is turned on.

When the controlling transistor Q3 is turned on, the electric potential at the R2-side of the capacitor C2 becomes substantially equal to the electric potential at the emitter of Q1. Therefore, the potential at the base of Q1 becomes higher than the potential at the emitter thereof, and the switching transistor Q1 is turned on. In this case, the difference in the electric potential between the base and the emitter of Q1 is substantially equal to the voltage charged to the capacitor C2.

The turn-on control circuit forcedly turns on the switching transistor Q1 before the energy stored in the transformer T is reset, i.e., before the switching transistor Q1 is turned on by self-oscillation. Period $T_{max}$ shown in FIG. 3, which is the period of time from turn-off of the switching transistor Q1 until successive forced turn-on, can be freely set within a specific range owing to the characteristics of the components constructing the turn-on controlling circuit. In the circuit shown in FIG. 2, $T_{max}$ can be varied by changing a time constant defined by the capacitor C3 and the resistance R3.

It can be appreciated that the time period in which the switching transistor Q1 is kept turned off will not exceed $T_{max}$. Therefore, the drop in a switching frequency can be limited to a certain value. When the turn-on circuit operates effectively, the switching transistor Q1 can be turned on before the energy stored in the transformer T is completely discharged, and energy can again be subsequently stored in the transformer T. In the wave-form chart of the primary winding current Ic shown in FIG. 3, the initial current value $\Delta i$ upon turn-on corresponds to the current caused by the energy remaining in the transformer T. The variation in a load current is observed from the input side of T as the variation of this initial current value $\Delta i$. In case the load current is extremely small, the transformer T is reset and the switching transistor Q1 is turned on by self-oscillation before forced turn-on.

The ringing choke converter according to one aspect of the present invention operates according to a continuous operation mode, that is, operates continuously without having the energy stored in the transformer T being reset when the load current is large. Therefore, the utilization efficiency of the transformer T, the switching transistor Q1, and the rectifying diode D1 can be improved. Also, both the peak value and the RMS of the input current Ic of the primary winding L1 can be reduced compared to a conventional circuit having the same load current.

Figure 4:
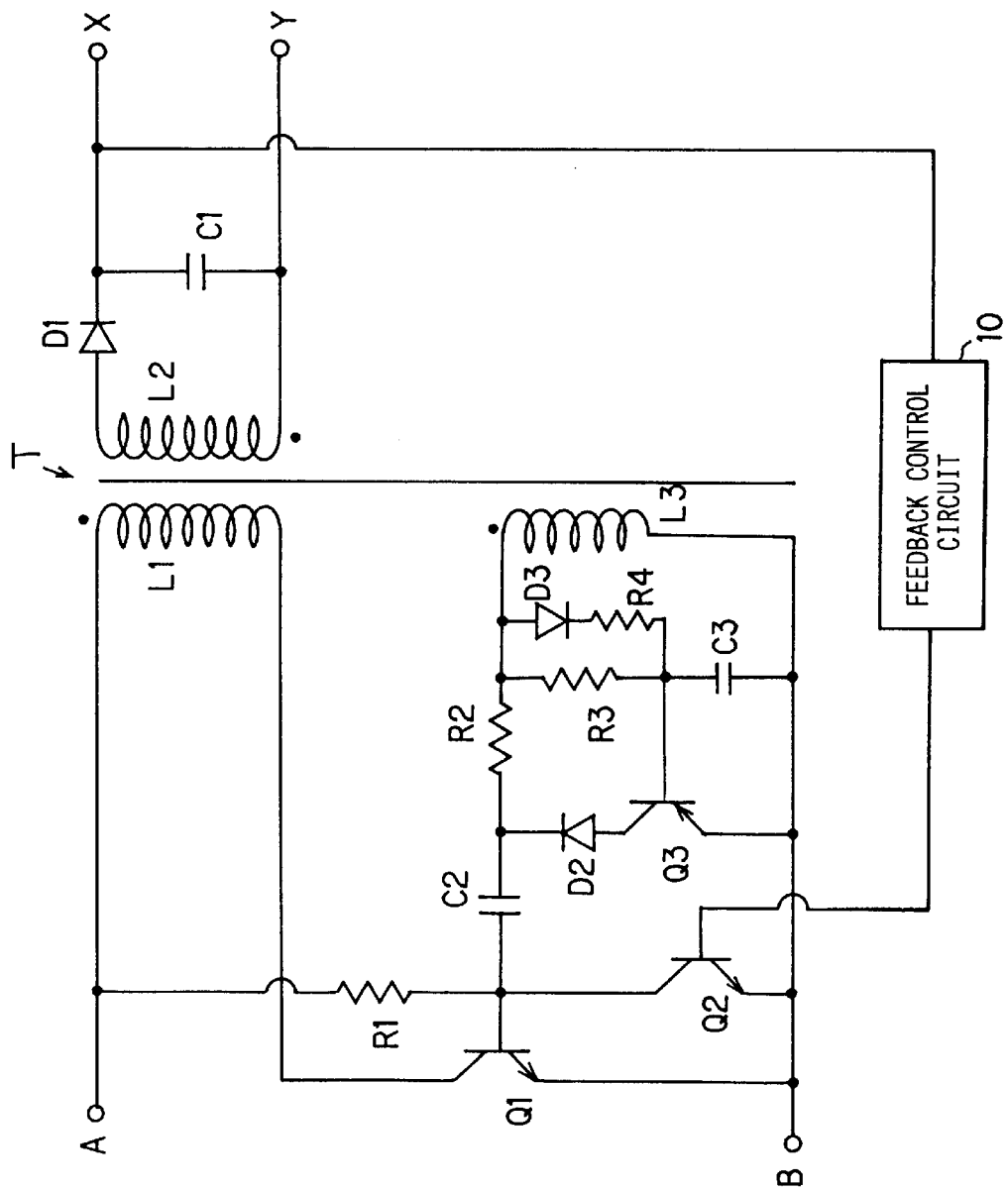
FIG. 4 is a schematic circuit diagram of a ringing choke converter according to another embodiment of the present invention.

FIG. 4 shows a circuit structure according to a further embodiment of the present invention. Two circuit elements are added to the circuit shown in FIG. 2.

Firstly, a diode D2 is connected between the collector of the controlling transistor Q3 and both the capacitor C2 and the resistance R2. This diode D2 is connected in a forward direction in respect of the collector current of Q3. That is, a anode of the diode D2 is connected to the collector of Q3. Secondly, a series circuit comprising a diode D3 and a resistance R4 is connected in parallel to the resistance R3. The direction of the diode D3 is determined so that the controlling transistor Q3 is reverse-biased by the voltage charged to the capacitor C3 when a current through D3 charges the capacitor C3.

The diode D2 is provided to prevent the current generated by the base winding L3 from leaking through the PN junction between the collector and the base of the controlling transistor Q3 when the switching transistor Q1 is turned on. With this structure, the current generated by the base winding L3 can be efficiently fed back to the switching transistor Q1.

The diode D3 is provided to rapidly charge the capacitor C3 with the current generated by the base winding L3 and to cut-off the controlling transistor Q3 as soon as possible when the switching transistor Q1 is turned on. High-speed operation can be realized by this structure.

Upon actual arrangement of the ringing choke converter according to one aspect of the present invention, it is preferred to use a nonlinear transformer as the transformer T, which has a larger inductance when the current running through the primary winding L1 is small.

It is preferred to use a transformer having a large inductance so as to prevent the switching frequency from becoming exceedingly high when the load current is small. In other words, the use of a large-inductance transformer serves to reduce the increase rate of the input current upon turn-on, and to lower the switching frequency. However, in the ringing choke converter according to the present invention, if a transformer having a large inductance is employed, the initial current value Δi (shown in FIG. 3) upon turn-on will be large when the load current is large. Therefore, the driving power required to forcedly turn on the switching transistor Q1 increases, thus causing increase in turn-on losses. Also, there is a high possibility that the transformer T will saturate. This calls for increase in the size of the core.

Figure 5:
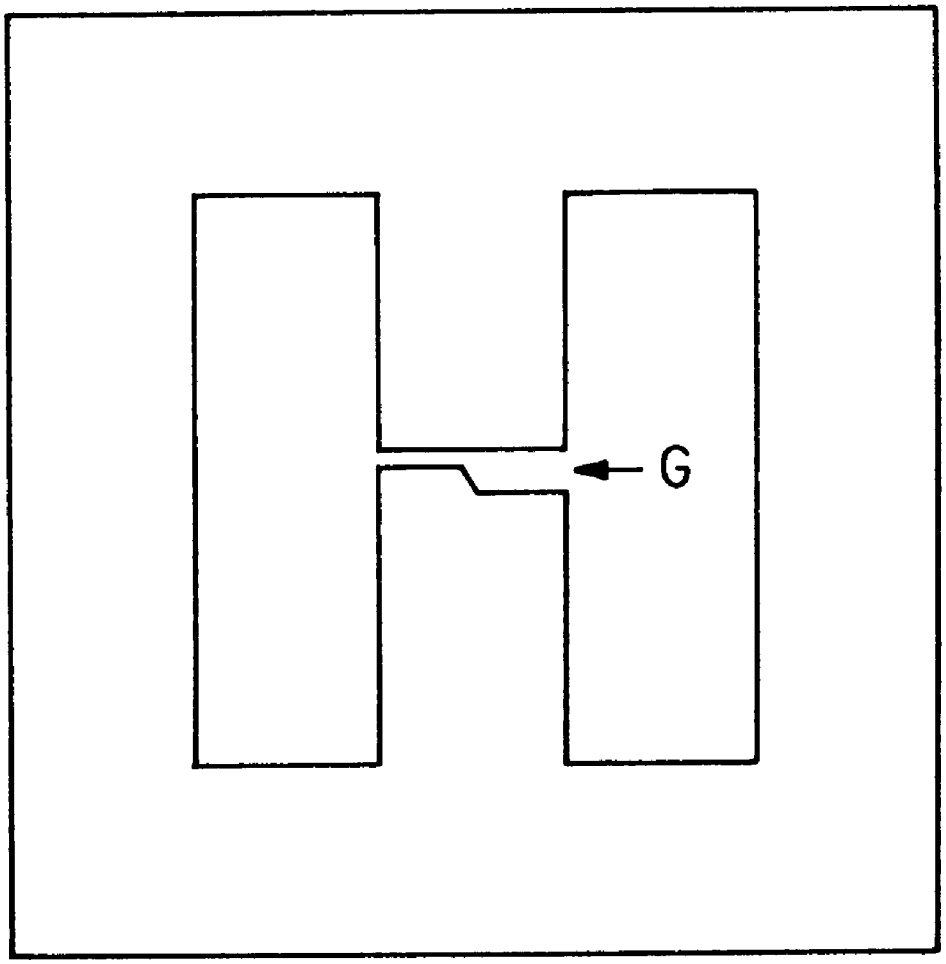
FIG. 5 is a schematic diagram of a core applicable to the transformer of the ringing choke converter according to the present invention.

From these reasons, a nonlinear transformer T may preferably be used, in which the inductance is decreased when the current running through the primary winding L1 is increased. With such a transformer T, the driving power to forcedly turn-on the switching transistor Q1 for a large load current can be reduced, thereby enabling reduction in turn-on losses. Further, since the transformer T will not easily saturate, the size of the transformer T can be reduced. The above-mentioned characteristics of the nonlinear transformer can be realized by providing a stepped gap G in the core as shown in FIG. 5.

From the detailed description given above, it can be readily appreciated that the ringing choke converter according to the present invention can be constructed by adding a simple turn-on control system to a basic circuit structure of an existing ringing choke converter. With this structure, the variation in a switching frequency can be kept within a small range even if the load current is extensively varied. Also, efficiency can be improved, and problems concerning noise characteristics can be solved.

The above-described embodiments of the circuit structure can rationally provide a system for turning on the switching transistor with a very small number of components, namely, the controlling transistor Q3, the capacitor C3, and the resistance R3. However, the present invention should not be limited to the above two embodiments, but it should include all embodiments which can realize the functions of a turn-on controlling system, i.e., the function to detect the turn-off of the switching transistor, and to forcedly turn-on the switching transistor after a predetermined amount of time.

What is claimed is:

1. A ringing choke converter, wherein:

one end of a primary winding of a transformer is connected to one input terminal;

the other end of said primary winding is connected to a collector of a switching transistor;

an emitter of said switching transistor is connected to the other input terminal;

an output of a secondary winding of said transformer is connected to output terminals via a rectifying/smoothing circuit;

one end of a base winding of said transformer is connected to a base of said switching transistor via a base driving device, and the other end of said base winding is connected to the emitter of said switching transistor, in order to turn on and off said switching transistor repetitively by self-oscillation;

a turn-off control system is provided therewith for stabilizing the voltage at the output terminals by variably controlling a turn-off timing of said switching transistor according to a voltage detected directly or indirectly at said output terminals; and a turn-on control system is provided therewith which detects a change in circuit operation when said switching transistor is turned off, and forcedly turns on said switching transistor when a predetermined period of time elapsed after said detection of change.

2. A ringing choke converter as set forth in claim 1, wherein:

said base driving elements comprise a series circuit of a resistance (R2) and a capacitor (C2), said resistance (R2) having one end connected to said base winding and said capacitor (C2) having one end connected to the base of said switching transistor; and said turn-on control circuit comprises a conductive-type transistor (Q3) which is a different type from said switching transistor, a resistance (R3), and a capacitor (C3), a collector of said transistor (Q3) being connected to a connecting point of said resistance (R2) and capacitor (C2), an emitter of said transistor (Q3) being connected to the other end of said base winding (L3), said resistance (R3) being connected between the base of said transistor (Q3) and said one end of said base winding (L3), and said capacitor (C3) being connected between the base and the emitter of said transistor (Q3).

3. A ringing choke converter as set forth in claim 2 wherein a diode (D2) is inserted between the collector of said transistor (Q3) and the connecting point of said resistance (R2) and said capacitor (C2) in a forward direction of a collector current of the transistor (Q3).

4. A ringing choke converter as set forth in claim 2 wherein a diode (D3) is connected in parallel to said resistance (R3) to charge said capacitor (C3) by a current through said diode (D3) so that said transistor (Q3) is reverse-biased.

5. A ringing choke converter as set forth in claim 1 wherein said transformer has a nonlinear characteristic in which an inductance of which becomes smaller when the current through the primary winding increases.

6. A self-excited DC/DC converter, comprising:

a transformer having a primary winding and a secondary winding, said primary winding connected to input terminals;

a switching transistor for controlling an input current through said primary winding of said transformer;

a rectifying/smoothing circuit connected between said secondary winding and output terminals;

a base driving circuit including a base winding at a primary side of said transformer for turning on and off said switching transistor by self-oscillation;

a turn-off control circuit for stabilizing a voltage at said output terminals by directly or indirectly detecting the voltage at said output terminals to variably control a turn-off timing of said switching transistor according to the detected voltage; and a turn-on control circuit for detecting a change in circuit operation when said switching transistor is turned off so as to turn on said switching transistor after a predetermined period of time after said detection.

* * * * *